United States Patent
Liao et al.

(10) Patent No.: US 12,489,886 B2
(45) Date of Patent: Dec. 2, 2025

(54) DERIVING BI-PREDICTION WITH CODING UNIT-LEVEL WEIGHT INDICES FOR MERGE CANDIDATES

(71) Applicant: Alibaba (China) Co., Ltd., Hangzhou (CN)

(72) Inventors: Ru-Ling Liao, Beijing (CN); Jie Chen, Beijing (CN); Yan Ye, San Diego, CA (US); Xinwei Li, Beijing (CN)

(73) Assignee: Alibaba (China) Co., Ltd., Hangzhou (CN)

( * ) Notice: Subject to any disclaimer, the term of this patent is extended or adjusted under 35 U.S.C. 154(b) by 225 days.

(21) Appl. No.: 18/215,753

(22) Filed: Jun. 28, 2023

(65) Prior Publication Data
US 2024/0007615 A1    Jan. 4, 2024

Related U.S. Application Data

(60) Provisional application No. 63/403,199, filed on Sep. 1, 2022, provisional application No. 63/358,215, filed on Jul. 4, 2022.

(51) Int. Cl.
*H04N 19/105* (2014.01)
*H04N 19/159* (2014.01)
*H04N 19/172* (2014.01)

(52) U.S. Cl.
CPC ......... *H04N 19/105* (2014.11); *H04N 19/159* (2014.11); *H04N 19/172* (2014.11)

(58) Field of Classification Search
CPC .. H04N 19/105; H04N 19/159; H04N 19/172; H04N 19/176; H04N 19/52; H04N 19/577
See application file for complete search history.

(56) References Cited

U.S. PATENT DOCUMENTS

2024/0146908 A1 * 5/2024 Zhang .................. H04N 19/567

\* cited by examiner

*Primary Examiner* — Kathleen V Nguyen
(74) *Attorney, Agent, or Firm* — Lee & Hayes, P.C.

(57) ABSTRACT

A VVC-standard encoder and a VVC-standard decoder are provided, implementing derivation of a BCW index according to cost values based on template matching. A template matching cost can be calculated for each among a set of possible BCW weight values, and a BCW weight value yielding a lowest template matching cost among each template matching cost calculated can be selected as a BCW index for a bi-predicted merge candidate. Alternatively, a template matching cost can be calculated for each among a subset of possible BCW weight values based on an inherited BCW weight. Additionally, a merge candidate BCW index can be derived while adjusting template matching cost of an inherited BCW weight from a value calculated according to the VVC standard and ECM specifications, or while adjusting template matching cost of a BCW weight having equal weight from a value calculated according to the VVC standard and ECM specifications.

17 Claims, 5 Drawing Sheets

DERIVING BI-PREDICTION WITH CODING UNIT-LEVEL WEIGHT INDICES FOR MERGE CANDIDATES

RELATED APPLICATIONS

This application claims the benefit of U.S. Patent Application No. 63/358,215, entitled "DERIVING BI-PREDICTION WITH CODING UNIT-LEVEL WEIGHT INDICES FOR MERGE CANDIDATES" and filed Jul. 4, 2022, and claims the benefit of U.S. Patent Application No. 63/403,199, entitled "DERIVING BI-PREDICTION WITH CODING UNIT-LEVEL WEIGHT INDICES FOR MERGE CANDIDATES" and filed Sep. 1, 2022, each of which is expressly incorporated herein by reference in its entirety.

BACKGROUND

In 2020, the Joint Video Experts Team ("JVET") of the ITU-T Video Coding Expert Group ("ITU-T VCEG") and the ISO/IEC Moving Picture Expert Group ("ISO/IEC MPEG") published the final draft of the next-generation video codec specification, Versatile Video Coding ("VVC"). This specification further improves video coding performance over prior standards such as H.264/AVC (Advanced Video Coding) and H.265/HEVC (High Efficiency Video Coding). Moreover, at time of writing, the VVC standard is extended by the latest draft of the Enhanced Compression model ("ECM"), presented at the 29th meeting of the JVET in January 2023 as "Algorithm description of Enhanced Compression Model 8 (ECM 8)".

Inter prediction may use uni-prediction or bi-prediction. In uni-prediction, only one motion vector pointing to one reference picture is used to generate the predictor for the current block; and in bi-prediction, two motion vectors, each pointing to its own reference picture are used to generate the predictor of the current block. According to the earlier HEVC standard, the bi-prediction signal is generated by averaging two prediction signals obtained from two different reference pictures and/or using two different motion vectors. According to the VVC standard, the bi-prediction mode is extended beyond simple averaging to allow weighted averaging of the two prediction signals, this technique being referred to as bi-prediction with coding unit ("CU")-level weight ("BCW") for brevity.

According to decoder-side motion vector refinement ("DMVR"), bi-prediction may be performed upon a current CU such that motion information of the current CU includes weighted averaging of two prediction signals, the weight index being inferred from neighboring blocks based on a merge candidate index. For merge candidates that meet conditions for DMVR, the adaptive decoder-side motion vector refinement technique further extends multi-pass DMVR, refining motion vectors in only one of the two bi-prediction directions.

According to the current VVC and ECM specifications, a BCW index for a merge-coded block is inherited from neighboring blocks according to a signaled merge candidate index. However, the inherited BCW index may not be suitable for the merge-coded block.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

In accordance with the VVC video coding standard (the "VVC standard") and motion prediction as described therein, a computing system includes at least one or more processors and a computer-readable storage medium communicatively coupled to the one or more processors. The computer-readable storage medium is a non-transient or non-transitory computer-readable storage medium, as defined subsequently with reference to FIG. 4, storing computer-readable instructions. At least some computer-readable instructions stored on a computer-readable storage medium are executable by one or more processors of a computing system to configure the one or more processors to perform associated operations of the computer-readable instructions, including at least operations of an encoder as described by the VVC standard, and operations of a decoder as described by the VVC standard. Some of these encoder operations and decoder operations according to the VVC standard are subsequently described in further detail, though these subsequent descriptions should not be understood as exhaustive of encoder operations and decoder operations according to the VVC standard. Subsequently, a "VVC-standard encoder" and a "VVC-standard decoder" shall describe the respective computer-readable instructions stored on a computer-readable storage medium which configure one or more processors to perform these respective operations (which can be called, by way of example, "reference implementations" of an encoder or a decoder).

Moreover, according to example embodiments of the present disclosure, a VVC-standard encoder and a VVC-standard decoder further include computer-readable instructions stored on a computer-readable storage medium which are executable by one or more processors of a computing system to configure the one or more processors to perform operations not specified by the VVC standard. A VVC-standard encoder should not be understood as limited to operations of a reference implementation of an encoder, but including further computer-readable instructions configuring one or more processors of a computing system to perform further operations as described herein. A VVC-standard decoder should not be understood as limited to operations of a reference implementation of a decoder, but including further computer-readable instructions configuring one or more processors of a computing system to perform further operations as described herein.

Figure 1A:
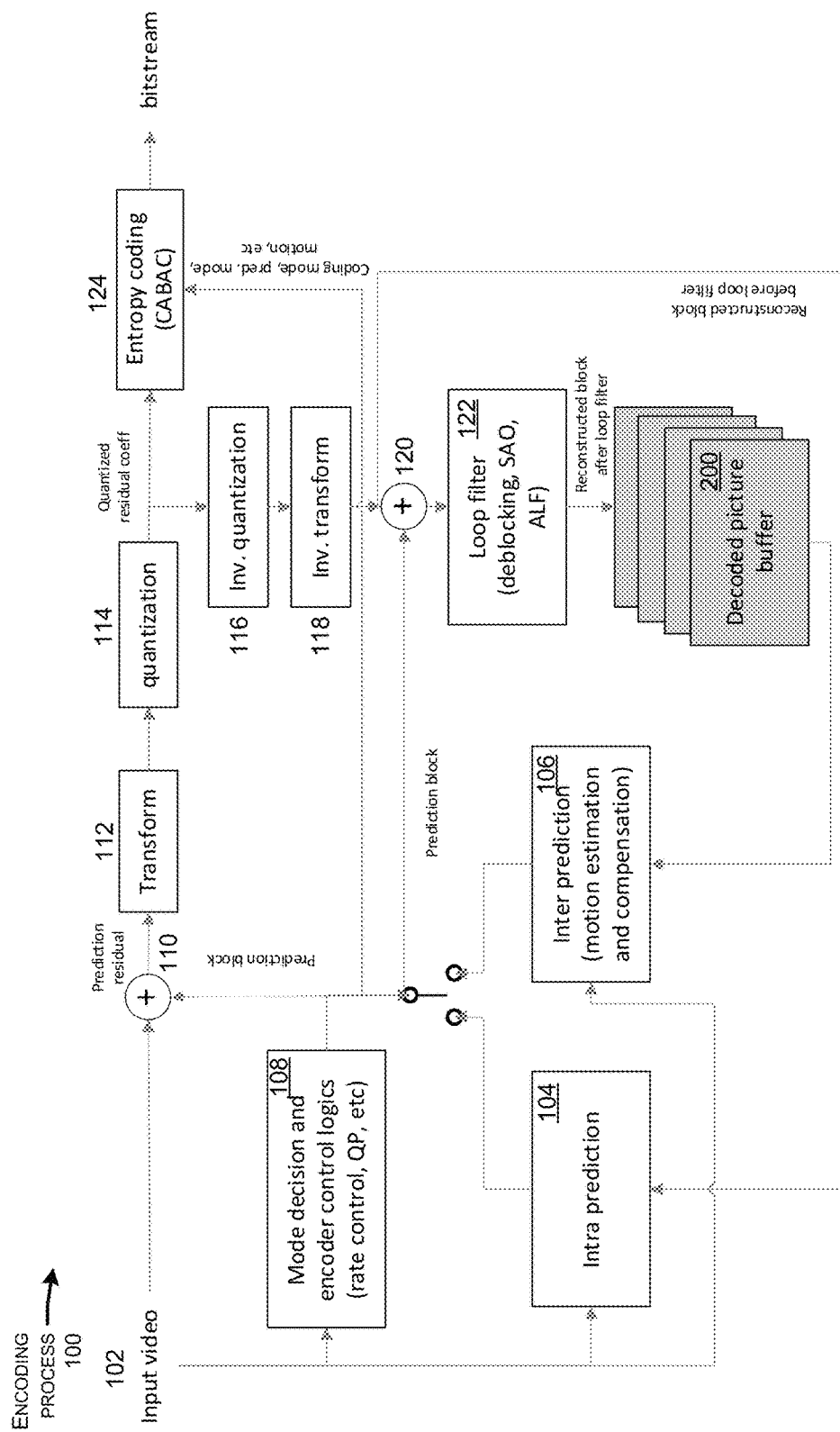
FIGS. 1A and 1B illustrate example block diagrams of, respectively, a video encoding process and a video decoding process according to example embodiments of the present disclosure.
Figure 1B:
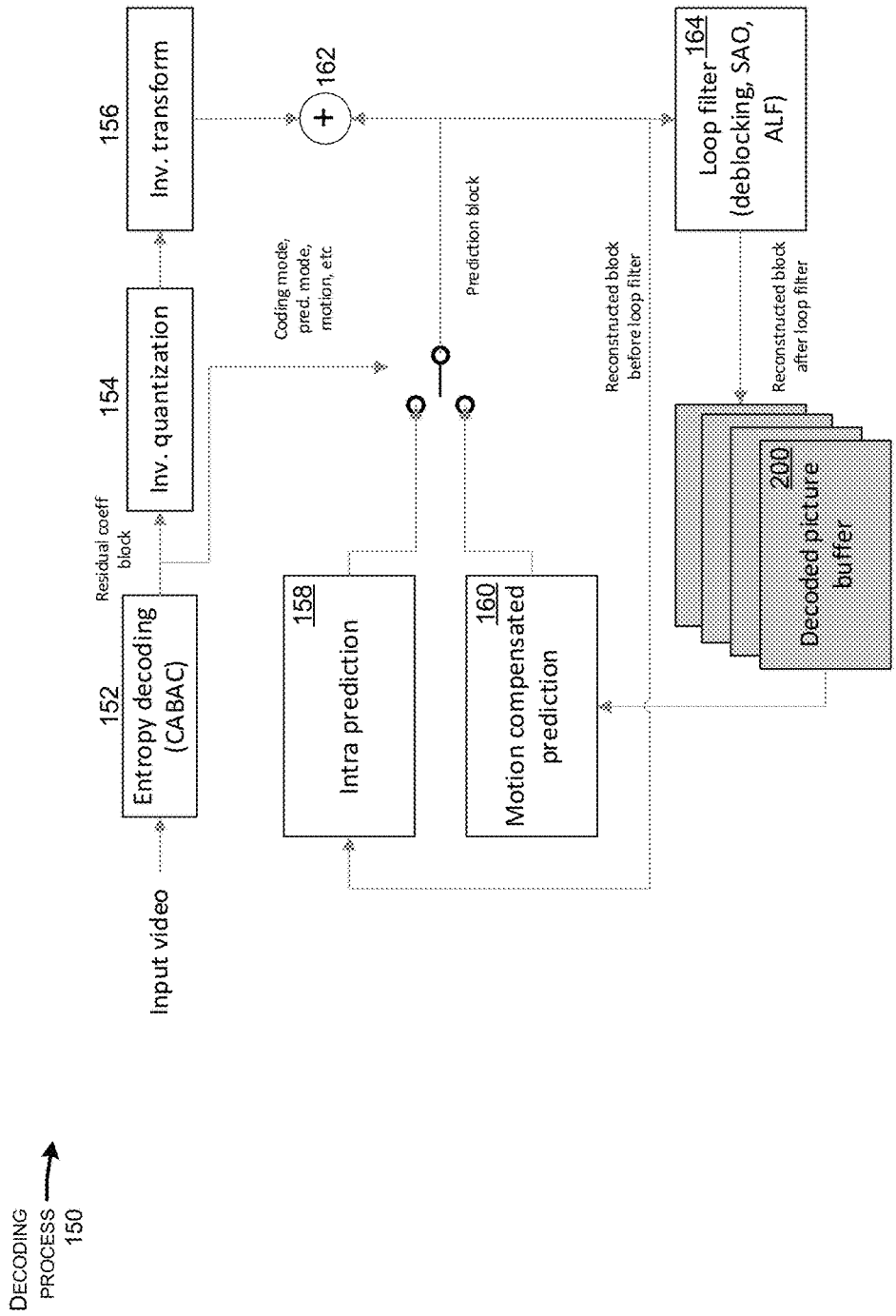

FIGS. 1A and 1B illustrate example block diagrams of, respectively, an encoding process 100 and a decoding process 150 according to an example embodiment of the present disclosure.

In an encoding process 100, a VVC-standard encoder configures one or more processors of a computing system to receive, as input, one or more input pictures from an image source 102. An input picture includes some number of pixels sampled by an image capture device, such as a photosensor array, and includes an uncompressed stream of multiple color channels (such as RGB color channels) storing color data at an original resolution of the picture, where each channel stores color data of each pixel of a picture using some number of bits. A VVC-standard encoder configures one or more processors of a computing system to store this uncompressed color data in a compressed format, wherein color data is stored at a lower resolution than the original resolution of the picture, encoded as a luma ("Y") channel and two chroma ("U" and "V") channels of lower resolution than the luma channel.

A VVC-standard encoder encodes a picture (a picture being encoded being called a "current picture," as distinguished from any other picture received from an image source 102) by configuring one or more processors of a computing system to partition the original picture into units and subunits according to a partitioning structure. A VVC-standard encoder configures one or more processors of a computing system to subdivide a picture into macroblocks ("MBs") each having dimensions of 16×16 pixels, which may be further subdivided into partitions. A VVC-standard encoder configures one or more processors of a computing system to subdivide a picture into coding tree units ("CTUs"), the luma and chroma components of which may be further subdivided into coding tree blocks ("CTBs") which are further subdivided into coding units ("CUs"). Alternatively, a VVC-standard encoder configures one or more processors of a computing system subdivide a picture into units of N×N pixels, which may then be further subdivided into subunits. Each of these largest subdivided units of a picture may generally be referred to as a "block" for the purpose of this disclosure.

A CU is coded using one block of luma samples and two corresponding blocks of chroma samples, where pictures are not monochrome and are coded using one coding tree.

A VVC-standard encoder configures one or more processors of a computing system to subdivide a block into partitions having dimensions in multiples of 4×4 pixels. For example, a partition of a block may have dimensions of 8×4 pixels, 4×8 pixels, 8×8 pixels, 16×8 pixels, or 8×16 pixels.

By encoding color information of blocks of a picture and subdivisions thereof, rather than color information of pixels of a full-resolution original picture, a VVC-standard encoder configures one or more processors of a computing system to encode color information of a picture at a lower resolution than the input picture, storing the color information in fewer bits than the input picture.

Furthermore, a VVC-standard encoder encodes a picture by configuring one or more processors of a computing system to perform motion prediction upon blocks of a current picture. Motion prediction coding refers to storing image data of a block of a current picture (where the block of the original picture, before coding, is referred to as an "input block") using motion information and prediction units ("PUs"), rather than pixel data, according to intra prediction 104 or inter prediction 106.

Motion information refers to data describing motion of a block structure of a picture or a unit or subunit thereof, such as motion vectors and references to blocks of a current picture or of a reference picture. PUs may refer to a unit or multiple subunits corresponding to a block structure among multiple block structures of a picture, such as an MB or a CTU, wherein blocks are partitioned based on the picture data and are coded according to the VVC standard. Motion information corresponding to a PU may describe motion prediction as encoded by a VVC-standard encoder as described herein.

A VVC-standard encoder configures one or more processors of a computing system to code motion prediction information over each block of a picture in a coding order among blocks, such as a raster scanning order wherein a first-decoded block is an uppermost and leftmost block of the picture. A block being encoded is called a "current block," as distinguished from any other block of a same picture.

According to ultra prediction 104, one or more processors of a computing system are configured to encode a block by references to motion information and PUs of one or more other blocks of the same picture. According to intra prediction coding, one or more processors of a computing system perform an intra prediction 104 (also called spatial prediction) computation by coding motion information of the current block based on spatially neighboring samples from spatially neighboring blocks of the current block.

According to inter prediction 106, one or more processors of a computing system are configured to encode a block by references to motion information and PUs of one or more other pictures. One or more processors of a computing system are configured to store one or more previously coded and decoded pictures in a reference picture buffer for the purpose of inter prediction coding; these stored pictures are called reference pictures.

One or more processors are configured to perform an inter prediction 106 (also called temporal prediction or motion compensated prediction) computation by coding motion information of the current block based on samples from one or more reference pictures. Inter prediction may further be computed according to uni-prediction or bi-prediction: in uni-prediction, only one motion vector, pointing to one reference picture, is used to generate a prediction signal for the current block. In bi-prediction, two motion vectors, each pointing to a respective reference picture, are used to generate a prediction signal of the current block.

According to bi-prediction implemented by the earlier HEVC standard, a bi-prediction signal is generated by averaging two prediction signals obtained from two different reference pictures and/or using two different motion vectors. In contrast, bi-prediction mode implemented by the VVC standard is extended beyond simple averaging to allow weighted averaging of the two prediction signals, this technique being referred to as bi-prediction with coding unit ("CU")-level weight ("BCW") for brevity. A weighted averaging of two prediction signals, $P_0$ and $P_1$, is calculated as $P_{bi-pred}$ according to Equation 1 below, where >> is a bitwise right shift operator.

$$P_{bi-pred}=((8-w)*P_0+w*P_1+4)>>3$$

Equation 1 is mathematically equivalent to:

$$P_{bi-pred} = \left(1 - \frac{w}{8}\right)*P_0 + \frac{w}{8}*P_1$$

Therefore, depending on a value of a weight w applied to Equation 1, $P_0$ and $P_1$ can be weighted equally or unequally.

For weight w=4, $P_0$ and $P_1$ are weighted equally. Therefore, weight w=4 is an "equal weight" as applied to Equation 1 (but not necessarily as applied to other weighted averaging bi-prediction equations herein). Moreover, weights w which, as applied to Equation 1, cause $P_0$ and $P_1$ to be both weighted positively are "positive weights" with respect to Equation 1 (where the equal weight is also a positive weight), and weights w which, as applied to Equation 1, cause one of $P_0$ and $P_1$ to be weighted negatively are "negative weights" with respect to Equation 1.

According to bi-prediction mode implemented by the VVC standard, a set of five possible weight values are allowed in the weighted averaging bi-prediction, w∈{-2, 3, 4, 5, 10}. For each bi-predicted CU, the weight w is determined in one of two ways: 1) for a non-merge-coded CU, the weight index is signaled after the motion vector difference; 2) for a merge-coded CU, the weight index is inferred from neighboring blocks based on the merge candidate index.

According to bi-prediction mode implemented by the VVC standard, BCW is only applied to CUs with 256 or more luma samples (i.e., CU width times CU height is greater than or equal to 256). For low-delay pictures, all 5 weights are used. For non-low-delay pictures, a set of only 3 possible weight values (w∈{3, 4, 5}) is used.

A VVC-standard encoder configures one or more processors of a computing system to code a CU to include reference indices to identify, for reference of a VVC-standard decoder, the prediction signal(s) of the current block. Motion vectors and reference indices are sent to the decoder to identify where the prediction signal(s) of the current block come from. One or more processors of a computing system can code a CU to include an inter prediction indicator. An inter prediction indicator indicates list 0 prediction in reference to a first reference picture list referred to as list 0, list 1 prediction in reference to a second reference picture list referred to as list 1, or bi-prediction in reference to both reference picture lists referred to as, respectively, list 0 and list 1.

In the cases of the inter prediction indicator indicating list 0 prediction or list 1 prediction, one or more processors of a computing system are configured to code a CU including a reference index referring to a reference picture of the reference picture buffer referenced by list 0 or by list 1, respectively. In the case of the inter prediction indicator indicating bi-prediction, one or more processors of a computing system are configured to code a CU including a first reference index referring to a first reference picture of the reference picture buffer referenced by list 0, and a second reference index referring to a second reference picture of the reference picture referenced by list 1.

A VVC-standard encoder configures one or more processors of a computing system to code each current block of a picture individually, outputting a prediction block for each. According to the VVC standard, a CTU can be as large as 128×128 luma samples (plus the corresponding chroma samples, depending on the chroma format). A CTU may be further partitioned into CUs according to a quad-tree, binary tree, or ternary tree. One or more processors of a computing system are configured to ultimately record coding parameter sets such as coding mode (intra mode or inter mode), motion information (reference index, motion vectors, etc.) for inter-coded blocks, and quantized residual coefficients, at syntax structures of leaf nodes of the partitioning structure.

After a prediction block is output, a VVC-standard encoder configures one or more processors of a computing system to send coding parameter sets such as coding mode (i.e., intra or inter prediction), a mode of intra prediction or a mode of inter prediction, and motion information to an entropy coder 124 (as described subsequently).

The VVC standard provides semantics for recording coding parameter sets for a CU. For example, with regard to the above-mentioned coding parameter sets, pred_mode_flag for a CU is set to 0 for an inter-coded block, and is set to 1 for an intra-coded block; general_merge_flag for a CU is set to indicate whether merge mode is used in inter prediction of the CU; inter_affine_flag and cu_affine_type_flag for a CU are set to indicate whether affine motion compensation is used in inter prediction of the CU; mvp_l0_flag and mvp_l1_flag are set to indicate a motion vector index in list 0 or in list 1, respectively; and ref_idx_l0 and ref_idx_l1 are set to indicate a reference picture index in list 0 or in list 1, respectively. It should be understood that the VVC standard includes semantics for recording various other information, flags, and options which are beyond the scope of the present disclosure.

A VVC-standard encoder further implements one or more mode decision and encoder control settings 108, including rate control settings. One or more processors of a computing system are configured to perform mode decision by, after intra or inter prediction, selecting an optimized prediction mode for the current block, based on the rate-distortion optimization method.

A rate control setting configures one or more processors of a computing system to assign different quantization parameters ("QPs") to different pictures. Magnitude of a QP determines a scale over which picture information is quantized during encoding by one or more processors (as shall be subsequently described), and thus determines an extent to which the encoding process 100 discards picture information (due to information falling between steps of the scale) from MBs of the sequence during coding.

A VVC-standard encoder further implements a subtractor 110. One or more processors of a computing system are configured to perform a subtraction operation by computing a difference between an input block and a prediction block. Based on the optimized prediction mode, the prediction block is subtracted from the input block. The difference between the input block and the prediction block is called prediction residual, or "residual" for brevity.

Based on a prediction residual, a VVC-standard encoder further implements a transform 112. One or more processors of a computing system are configured to perform a transform operation on the residual by a matrix arithmetic operation to compute an array of coefficients (which can be referred to as "residual coefficients," "transform coefficients," and the like), thereby encoding a current block as a transform block ("TB"). Transform coefficients may refer to coefficients representing one of several spatial transformations, such as a diagonal flip, a vertical flip, or a rotation, which may be applied to a sub-block.

It should be understood that a coefficient can be stored as two components, an absolute value and a sign, as shall be described in further detail subsequently.

Sub-blocks of CUs, such as PUs and TBs, can be arranged in any combination of sub-block dimensions as described above. A VVC-standard encoder configures one or more processors of a computing system to subdivide a CU into a residual quadtree ("RQT"), a hierarchical structure of TBs. The RQT provides an order for motion prediction and residual coding over sub-blocks of each level and recursively down each level of the RQT.

A VVC-standard encoder further implements a quantization 114. One or more processors of a computing system are configured to perform a quantization operation on the residual coefficients by a matrix arithmetic operation, based on a quantization matrix and the QP as assigned above. Residual coefficients falling within an interval are kept, and residual coefficients falling outside the interval step are discarded.

A VVC-standard encoder further implements an inverse quantization 116 and an inverse transform 118. One or more processors of a computing system are configured to perform an inverse quantization operation and an inverse transform operation on the quantized residual coefficients, by matrix arithmetic operations which are the inverse of the quantization operation and transform operation as described above. The inverse quantization operation and the inverse transform operation yield a reconstructed residual.

A VVC-standard encoder further implements an adder 120. One or more processors of a computing system are configured perform an addition operation by adding a prediction block and a reconstructed residual, outputting a reconstructed block.

A VVC-standard encoder further implements a loop filter 122. One or more processors of a computing system are configured to apply a loop filter, such as a deblocking filter, a sample adaptive offset ("SAO") filter, and adaptive loop filter ("ALF") to a reconstructed block, outputting a filtered reconstructed block.

A VVC-standard encoder further configures one or more processors of a computing system to output a filtered reconstructed block to a decoded picture buffer ("DPB") 200. A DPB 200 stores reconstructed pictures which are used by one or more processors of a computing system as reference pictures in coding pictures other than the current picture, as described above with reference to inter prediction.

A VVC-standard encoder further implements an entropy coder 124. One or more processors of a computing system are configured to perform entropy coding, wherein, according to the Context-Sensitive Binary Arithmetic Codec ("CABAC"), symbols making up quantized residual coefficients are coded by mappings to binary strings (subsequently "bins"), which can be transmitted in an output bitstream at a compressed bitrate. The symbols of the quantized residual coefficients which are coded include absolute values of the residual coefficients (these absolute values being subsequently referred to as "residual coefficient levels").

Thus, the entropy coder configures one or more processors of a computing system to code residual coefficient levels of a block; bypass coding of residual coefficient signs and record the residual coefficient signs with the coded block; record coding parameter sets such as coding mode, a mode of intra prediction or a mode of inter prediction, and motion information coded in syntax structures of a coded block (such as a picture parameter set ("PPS") found in a picture header, as well as a sequence parameter set ("SPS") found in a sequence of multiple pictures); and output the coded block.

A VVC-standard encoder configures one or more processors of a computing system to output a coded picture, made up of coded blocks from the entropy coder 124. The coded picture is output to a transmission buffer, where it is ultimately packed into a bitstream for output from the VVC-standard encoder. The bitstream is written by one or more processors of a computing system to a non-transient or non-transitory computer-readable storage medium of the computing system, for transmission.

In a decoding process 150, a VVC-standard decoder configures one or more processors of a computing system to receive, as input, one or more coded pictures from a bitstream.

A VVC-standard decoder implements an entropy decoder 152. One or more processors of a computing system are configured to perform entropy decoding, wherein, according to CABAC, bins are decoded by reversing the mappings of symbols to bins, thereby recovering the entropy-coded quantized residual coefficients. The entropy decoder 152 outputs the quantized residual coefficients, outputs the coding-bypassed residual coefficient signs, and also outputs the syntax structures such as a PPS and a SPS.

A VVC-standard decoder further implements an inverse quantization 154 and an inverse transform 156. One or more processors of a computing system are configured to perform an inverse quantization operation and an inverse transform operation on the decoded quantized residual coefficients, by matrix arithmetic operations which are the inverse of the quantization operation and transform operation as described above. The inverse quantization operation and the inverse transform operation yield a reconstructed residual.

Furthermore, based on coding parameter sets recorded in syntax structures such as PPS and a SPS by the entropy coder 124 (or, alternatively, received by out-of-band transmission or coded into the decoder), and a coding mode included in the coding parameter sets, the VVC-standard decoder determines whether to apply intra prediction 156 (i.e., spatial prediction) or to apply motion compensated prediction 158 (i.e., temporal prediction) to the reconstructed residual.

In the event that the coding parameter sets specify intra prediction, the VVC-standard decoder configures one or more processors of a computing system to perform intra prediction 158 using prediction information specified in the coding parameter sets. The intra prediction 158 thereby generates a prediction signal.

In the event that the coding parameter sets specify inter prediction, the VVC-standard decoder configures one or more processors of a computing system to perform motion compensated prediction 160 using a reference picture from a DPB 200. The motion compensated prediction 160 thereby generates a prediction signal.

A VVC-standard decoder further implements an adder 162. The adder 162 configures one or more processors of a computing system to perform an addition operation on the reconstructed residuals and the prediction signal, thereby outputting a reconstructed block.

A VVC-standard decoder further implements a loop filter 164. One or more processors of a computing system are configured to apply a loop filter, such as a deblocking filter, a SAO filter, and ALF to a reconstructed block, outputting a filtered reconstructed block.

A VVC-standard decoder further configures one or more processors of a computing system to output a filtered reconstructed block to the DPB 200. As described above, a DPB 200 stores reconstructed pictures which are used by one or more processors of a computing system as reference pictures in coding pictures other than the current picture, as described above with reference to motion compensated prediction.

A VVC-standard decoder further configures one or more processors of a computing system to output reconstructed pictures from the DPB to a user-viewable display of a computing system, such as a television display, a personal computing monitor, a smartphone display, or a tablet display.

Therefore, as illustrated by an encoding process 100 and a decoding process 150 as described above, a VVC-standard encoder and a VVC-standard decoder each implements motion prediction coding in accordance with the VVC specification. A VVC-standard encoder and a VVC-standard decoder each configures one or more processors of a computing system to generate a reconstructed picture based on a previous reconstructed picture of a DPB according to motion compensated prediction as described by the VVC standard, wherein the previous reconstructed picture serves as a reference picture in motion compensated prediction as described herein.

A VVC-standard encoder and a VVC-standard decoder each configures one or more processors of a computing system to predict motion information of a CU of a reconstructed picture by various merge modes, such as a regular merge mode, a template matching merge mode, a decoder-side motion vector refinement ("DMVR") mode, a motion vector difference ("MMVD") mode, an affine merge mode, an affine plus MMVD merge mode, a combined inter and intra prediction ("CIIP") mode, and the like. Such CUs having motion information predicted by a merge mode are subsequently referred to as "merge-coded CUs." The motion information may include a plurality of motion vectors. Deriving motion vectors is known to persons skilled in the art and need not be reiterated herein.

Motion information of a CU of a reconstructed picture may include a motion candidate list. A motion candidate list may be a data structure containing references to multiple motion candidates. A motion candidate may be a block structure or a subunit thereof, such as a pixel or any other suitable subdivision of a block structure of a current picture, or may be a reference to a motion candidate of another picture. A motion candidate may be a spatial motion candidate or a temporal motion candidate. By applying motion vector compensation ("MVC"), a VVC-standard decoder configures one or more processors of a computing system to select a motion candidate from the motion candidate list and derive a motion vector of the motion candidate as a motion vector of the CU of the reconstructed picture.

A motion candidate list can be a merge candidate list, and can include up to five types of merge candidates, or six according to ECM. The merge candidate list can be signaled to one or more processors of a computing system during coding of a CU by a merge candidate index. Spatial merge candidates of the list can be derived from, by way of example, searching neighboring blocks of the current CU, and adding motion information of those neighboring blocks to the merge candidate list.

Temporal merge candidates of the list can be derived from, by way of example, deriving motion information of a co-located CU belonging to a co-located reference picture.

A merge candidate list for a current CU coded according to a merge mode may include the following merge candidates, in order: spatial motion vector prediction ("MVP") candidates from spatially neighboring CUs to the current CU; temporal MVP candidates from co-located CUs of the current CU; history-based MVP ("HMVP") candidates from a FIFO table; pairwise average MVP candidates; and a zero motion vector.

Moreover, after the merge candidate list is constructed, the merge candidates are reordered according to adaptive reordering of merge candidates with template matching, hereinafter referred to as "ARMC-TM". Merge candidates are reordered in ascending order of cost values based on template matching. For simplification, merge candidates in the last but not the first subgroup are not reordered. The template matching cost of a merge candidate is measured by a sum of absolute differences ("SAD") computed between samples of a template of the current block and their corresponding reference samples. A template of a current block includes a set of reconstructed samples neighboring to the current block. Reference samples of the template of the current block are located by motion information of the merge candidate.

ARMC-TM can be applied for motion prediction by merge modes including: a regular merge mode; a CIIP mode; an adaptive decoder-side motion vector refinement mode; a template matching ("TM") merge mode; and an affine merge mode, excluding a subblock-based temporal motion vector prediction ("SbTMVP").

Any merge candidate of the merge candidate list can include motion information predicted by bi-directional prediction. In such cases, reference samples of the template of the merge candidate are also generated by bi-prediction; bilateral template matching can therefore be performed based on such merge candidates, subsequently referred to as "bilateral matching ('BM') candidates".

Figure 2:
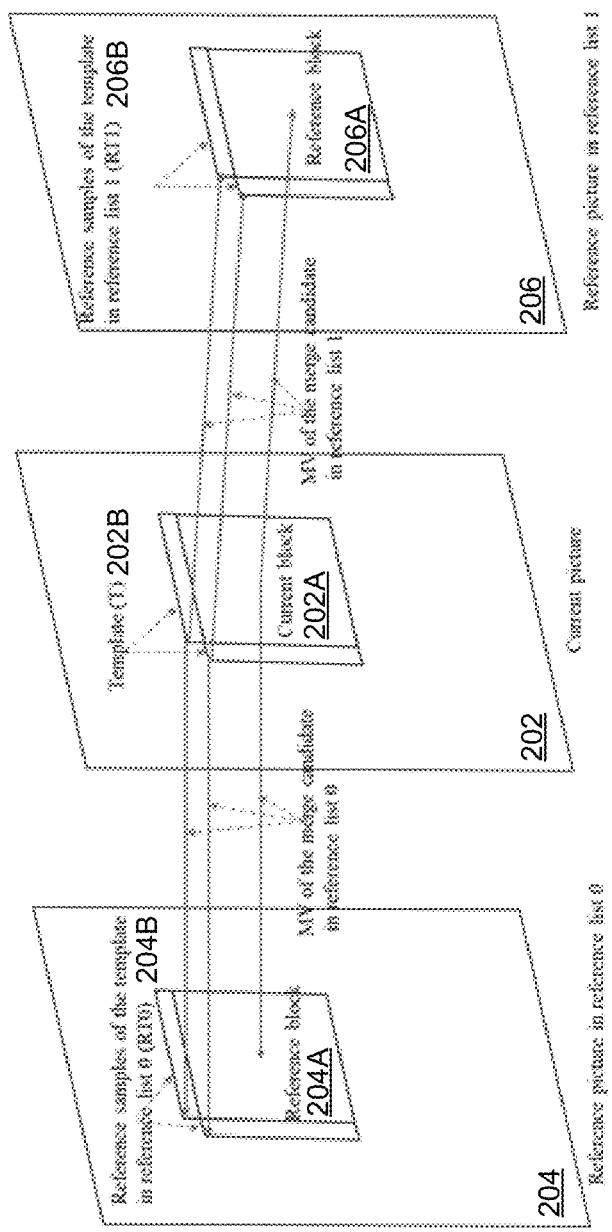
FIG. 2 illustrates motion prediction performed upon a current picture according to bi-prediction.

FIG. 2 illustrates motion prediction performed upon a current picture 202 according to bi-prediction. The current picture 202 includes a current block 202A, which includes a template 202B. Reference samples of the template reference two co-located reference pictures 204 and 206, one from reference list 0 in a first temporal direction, and one from reference list 1 in a second temporal direction, in accordance with bi-prediction. Motion information of the current block 202A refers to a co-located reference block 204A of the co-located reference picture 204, and refers to a co-located reference block 206A of the co-located reference picture 206. The template 202B of the current block 202A refers to reference samples 204B of the co-located reference picture 204, and refers to reference samples 206B of the co-located reference picture 206.

According to the adaptive decoder-side motion vector refinement technique, two additional merge modes are provided for merge candidates which meet conditions for DMVR: a merge mode wherein motion vectors of a current CU are refined by multi-pass DMVR in a first temporal direction but not in a second temporal direction, and a merge mode wherein motion vectors of a current CU are refined by multi-pass DMVR in a second temporal direction but not in a first temporal direction.

For both of the additional merge modes, a common merge candidate list is constructed from only merge candidates which meet DMVR conditions. The merge candidates for the common merge candidate list are derived from spatial neighboring coded blocks, TMVPs, non-adjacent blocks, HMVPs, and pairwise candidates, in a fashion similar to a merge candidate list as described above.

In the event that the merge candidate list includes BM candidates as illustrated above in FIG. 2, such bi-prediction merge candidates inherit, for weighted averaging of prediction signals, a weight index inferred from neighboring blocks based on the signaled merge candidate index.

Given this merge candidate list, the multi-pass DMVR process is applied for the merge candidates to refine the motion vectors. The DMVR process is modified by measuring distortion by computing a motion vector difference ("MVD") between a motion vector and a motion vector prediction ("MVP"). MVD can be computed by mean-removed sum of absolute differences ("MRSAD"), or can be computed by mean-removed sun of absolute transformed differences ("MRSATD") if the weights are non-equal and the bi-prediction is weighted with BCW weights; however, either MVD0 (MVD in a first temporal direction) or MVD1 (MVD in a second temporal direction) is set to zero during a first pass (i.e., PU level) of the multi-pass DMVR process. Merge index is coded as in regular merge mode.

According to example embodiments of the present disclosure, an additional BCW weight may be derived based on picture order count ("POC") difference.

By way of example, if both reference pictures are in a same temporal direction (i.e., both from the past or from the future) relative to the current picture, and the current picture is a low-delay picture, the weight pair (−3, 11) may be added.

By way of another example, if both reference pictures are in a same temporal direction (i.e., both from the past or from the future) relative to the current picture, and the current picture is a non-low-delay picture, the weight pair (−2, 10) may be added.

By way of yet another example, for any other circumstances, the weight pair (2, 6) may be added.

According to any of the above examples, the larger value from the weight pair may be assigned to the closest POC reference picture or list 0 reference picture when the POC distance is the same.

According to any of the above examples, the additional BCW weight may be assigned to pair-wise and zero merge candidates in place of an equal weight with respect to a weighted averaging bi-prediction equation.

As described above, in accordance with the VVC standard and ECM specifications, the BCW index for a merge-coded block is inherited from neighboring blocks according to a signaled merge candidate index. However, the inherited BCW index may not be suitable for the merge-coded block. Therefore, example embodiments of the present disclosure implement derivation of a BCW index according to cost values based on template matching.

In one or more aspects, example embodiments of the present disclosure provide derivation of a merge candidate BCW index according to template matching cost.

In one or more aspects, example embodiments of the present disclosure provide derivation of a merge candidate BCW index according to template matching cost, with a reduced set of possible weight values.

In one or more aspects, example embodiments of the present disclosure provide derivation of a merge candidate BCW index according to template matching cost, with an expanded set of possible weight values.

In one or more aspects, example embodiments of the present disclosure provide derivation of a merge candidate BCW index according to template matching cost, with an expanded set of possible weight values and heightened weighting precision.

In one or more aspects, example embodiments of the present disclosure provide derivation of a merge candidate BCW index according to template matching cost, while adjusting template matching cost of an inherited BCW weight.

In one or more aspects, example embodiments of the present disclosure provide application of bi-directional optical flow to bi-predicted merge candidates with equal weight with respect to a weighted averaging bi-prediction equation.

In one or more aspects, example embodiments of the present disclosure provide derivation of a merge candidate BCW index according to template matching cost before applying ARMC-TM to merge candidates.

In one or more aspects, example embodiments of the present disclosure provide derivation of a merge candidate BCW index according to template matching cost after applying ARMC-TM to merge candidates.

In one or more aspects, example embodiments of the present disclosure provide derivation of a merge candidate BCW index according to template matching cost for a subset of possible merge modes.

In one or more aspects, example embodiments of the present disclosure provide derivation of a merge candidate BCW index while inheriting BCW indices from non-adjacent spatial merge candidates.

Subsequently, each of the above aspects of example embodiments of the present disclosure is described in further detail.

Figure 3:
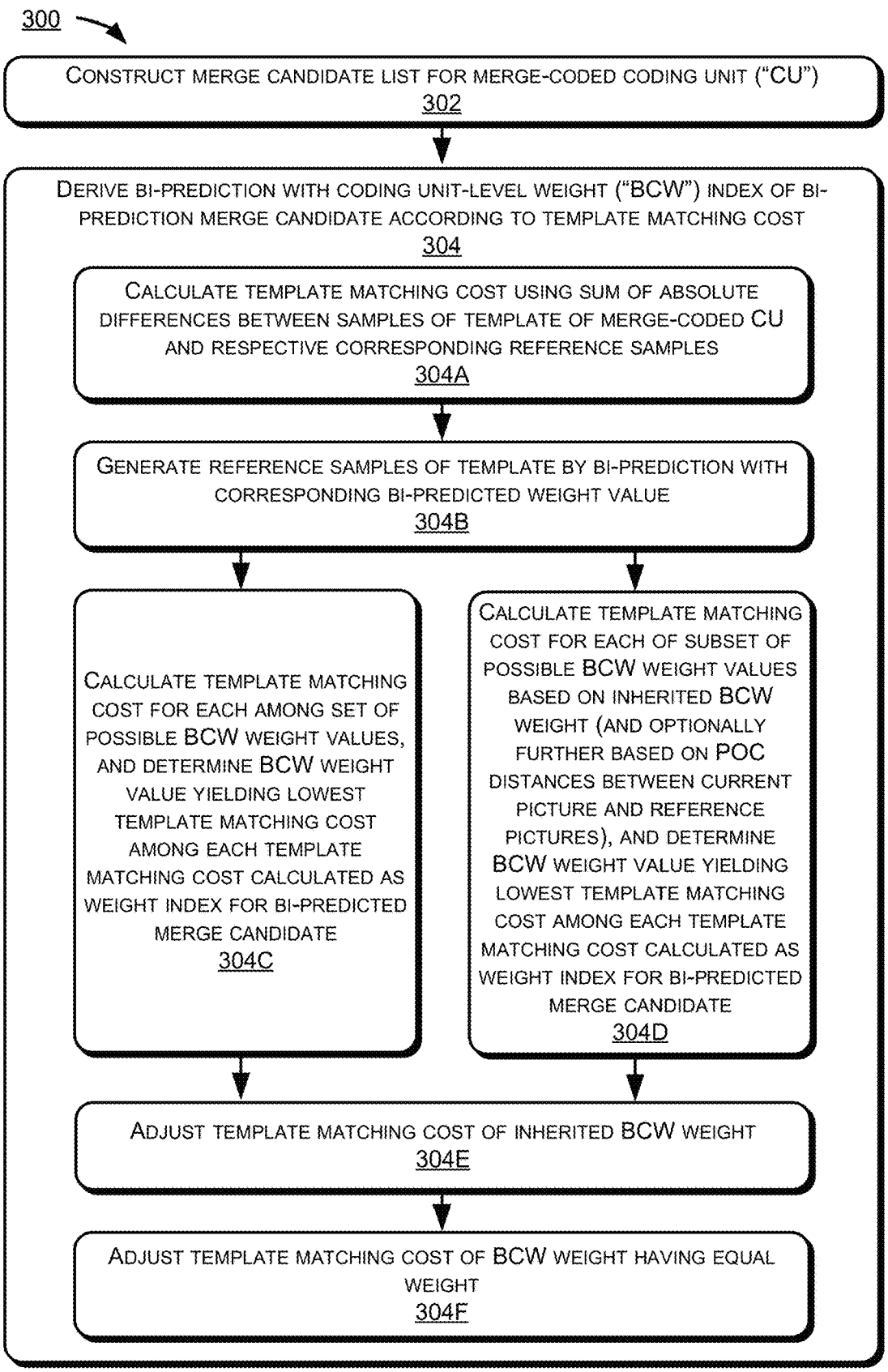
FIG. 3 illustrates a flowchart of a method wherein a VVC-standard encoder or a VVC-standard decoder configures one or more processors of a computing system to derive a merge candidate BCW index according to template matching cost while utilizing a set of possible weight values in accordance with the VVC standard and ECM specifications.

FIG. 3 illustrates a flowchart of a method 300 wherein a VVC-standard encoder or a VVC-standard decoder configures one or more processors of a computing system to derive a merge candidate BCW index according to template matching cost while utilizing a set of possible weight values in accordance with the VVC standard and ECM specifications.

It should be understood that "decoder-side" as used herein does not mean that this method is implemented exclusively by decoders; rather, steps of this method can be implemented similarly or identically by encoders and decoders. References to "a VVC-standard encoder or a VVC-standard decoder" should be understood as meaning that a step is performed in a similar or identical fashion by one or more processors of a computing system whether the processor(s) are configured by a VVC-standard encoder or a VVC-standard decoder.

At a step 302, as described above, a VVC-standard encoder or a VVC-standard decoder configures one or more processors of a computing system to construct a merge candidate list for a merge-coded CU.

At a step 304, for each merge candidate in the merge candidate list, if the merge candidate is a bi-predicted candidate, a VVC-standard encoder or a VVC-standard decoder configures one or more processors of a computing system to derive a BCW index of a bi-predicted merge candidate according to a template matching cost. Bi-predicted weight of the merge candidate is determined by a weight index of the bi-predicted merge candidate (subsequently referred to as a "BCW index"). A VVC-standard encoder or a VVC-standard decoder configures one or more processors of a computing system to derive a BCW index in one or more sub-steps, described subsequently with reference to sub-steps 304A, 304B, 304C, 304D, and 304E.

At a step 304A, for each bi-predicted weight (i.e., BCW index), a VVC-standard encoder or a VVC-standard decoder configures one or more processors of a computing system to calculate a template matching cost using a SAD between samples of a template of the merge-coded CU and respective corresponding reference samples. (It should be understood that, according to bi-prediction under the VVC standard, a template includes reconstructed samples neighboring to the left and/or to the top of the merge-coded CU, such as illustrated by template 202B of FIG. 2.)

At a step 304B, a VVC-standard encoder or a VVC-standard decoder configures one or more processors of a computing system to generate reference samples of the template by bi-prediction with the corresponding bi-predicted weight value.

At a step 304C, a VVC-standard encoder or a VVC-standard decoder configures one or more processors of a computing system to calculate a template matching cost for each among a set of possible BCW weight values, and select a BCW weight value yielding a lowest template matching cost among each template matching cost calculated as a BCW index for a bi-predicted merge candidate. According to example embodiments of the present disclosure, various examples of performing step 304C are subsequently described.

For example, for a bi-predicted merge candidate in non-low-delay pictures, three template matching cost values are calculated for each among a set of three possible BCW weight values. The set of three possible BCW weight values represent three different weight values (w∈ {3, 4, 5}, where w is as defined above with reference to Equation 1), respectively.

Thus, among three template matching costs calculated from these three possible weight values, a VVC-standard encoder or a VVC-standard decoder configures one or more processors of a computing system to determine a weight value yielding a lowest template matching cost as a BCW index for the bi-predicted merge candidate.

According to examples of step 304C, a set of possible weight values corresponds to a set of possible weight values in a weighted averaging bi-prediction as provided by the VVC standard and/or ECM specifications. That is, for low-delay-pictures, a VVC-standard encoder or a VVC-standard decoder configures one or more processors of a computing system to calculate template matching costs from a set of 5 possible weight values (w∈ {−2, 3, 4, 5, 10}), and for non-low-delay pictures, a VVC-standard encoder or a VVC-standard decoder configures one or more processors of a computing system to calculate template matching costs from a set of 3 possible weight values (w∈ {3, 4, 5}). Furthermore, a weighted averaging of two prediction signals, $P_0$ and $P_1$, is calculated as $P_{bi-pred}$ according to Equation 1 above.

According to further examples of step 304C, a set of possible weight values is a reduced set of possible weight values compared to possible weight values in a weighted averaging bi-prediction as provided by the VVC standard and/or ECM specifications. For both low-delay-pictures and non-low-delay pictures, a VVC-standard encoder or a VVC-standard decoder configures one or more processors of a computing system to calculate template matching costs from a set of 3 possible weight values (w∈ {3, 4, 5}); that is, the negative weights with respect to Equation 1 are excluded. Furthermore, a weighted averaging of two prediction signals, $P_0$ and $P_1$, is calculated as $P_{bi-pred}$ according to Equation 1 above.

According to further examples of step 304C, a set of possible weight values is an expanded set of possible weight values compared to possible weight values in a weighted averaging bi-prediction as provided by the VVC standard and/or ECM specifications. By way of example, a VVC-standard encoder or a VVC-standard decoder configures one or more processors of a computing system to calculate template matching costs from a set of 7 possible weight values (w∈ {1, 2, 3, 4, 5, 6, 7}) for both low-delay-pictures and non-low-delay pictures. This can be implemented by removing a bit overhead in the coding of a CU for signaling a BCW index. Furthermore, a weighted averaging of two prediction signals, $P_0$ and $P_1$, is calculated as $P_{bi-pred}$ according to Equation 1 above.

According to further examples of step 304C, a set of possible weight values is an expanded set of possible weight values compared to possible weight values in a weighted averaging bi-prediction as provided by the VVC standard and/or ECM specifications. By way of example, a VVC-standard encoder or a VVC-standard decoder configures one or more processors of a computing system to calculate template matching costs from a set of 5 possible weight values (w∈ {6, 7, 8, 9, 10}) for both low-delay-pictures and non-low-delay pictures. Furthermore, a weighted averaging of two prediction signals, $P_0$ and $P_1$, is calculated as $P_{bi-pred}$ according to Equation 2 below, where >> is a bitwise right shift operator.

$$P_{bi-pred} = ((16-w)*P_0 + w*P_1 + 8) >> 4$$

Equation 2 is mathematically equivalent to $$P_{bi-pred} = \left(1 - \frac{w}{16}\right) * P_0 + \frac{w}{16} * P_1$$

Depending on a value of a weight w applied to Equation 2, $P_0$ and $P_1$ can be weighted equally or unequally. For weight w=8, $P_0$ and $P_1$ are weighted equally. Therefore, weight w=8 is an "equal weight" as applied to Equation 2 (but not necessarily as applied to other weighted averaging bi-prediction equations herein). Moreover, weights w which, as applied to Equation 2, cause $P_0$ and $P_1$ to be both weighted positively are "positive weights" with respect to Equation 2 (where the equal weight is also a positive weight), and weights w which, as applied to Equation 2, cause one of $P_0$ and $P_1$ to be weighted negatively are "negative weights" with respect to Equation 2.

According to further example embodiments of the present disclosure, at a step 304D, a VVC-standard encoder or a VVC-standard decoder configures one or more processors of a computing system to calculate a template matching cost for each among a subset of possible BCW weight values based on an inherited BCW weight, and select a BCW weight value yielding a lowest template matching cost among each template matching cost calculated as a BCW index for a bi-predicted merge candidate. According to example embodiments of the present disclosure, various examples of performing step 304D are subsequently described.

According to examples of step 304D, a VVC-standard encoder or a VVC-standard decoder configures one or more processors of a computing system to calculate a template matching cost for each among a subset of possible BCW weight values based on an inherited BCW weight being a positive weight with respect to a weighted averaging bi-prediction equation (i.e., w in Equation 1 and Equation 2). For a positive inherited weight, a subset of possible weight values for which template matching costs are calculated includes only positive weights with respect to a weighted averaging bi-prediction equation (positive weights being determined differently with respect to Equation 1 and Equation 2 above). It is noted that for a positive weight w, it follows that the weight for $P_0$ (i.e., 8−w with respect to Equation 1, or 16−w with respect to Equation 2) and the weight for $P_1$ (i.e., w) are both larger than 0.

By way of example, a set of possible weight values with respect to Equation 1 is determined to be {−2, 3, 4, 5, 10}. For a positive inherited weight (i.e., with respect to Equation 1, the inherited weight is one of {3, 4, 5}), template matching costs of {3, 4, 5} are calculated according to step 304D, and template matching costs of {−2, 10} are not calculated according to step 304D. For a non-positive inherited weight, template matching costs of {−2, 3, 4, 5, 10} are calculated as in step 304C.

According to examples of step 304D, a VVC-standard encoder or a VVC-standard decoder configures one or more processors of a computing system to calculate a template matching cost for each among a subset of possible BCW weight values based on an inherited BCW weight being a negative weight with respect to a weighted averaging bi-prediction equation. For a negative inherited weight, a subset of possible weight values for which template matching costs are calculated includes only negative weights with respect to a weighted averaging bi-prediction equation (negative weights being determined differently with respect to Equation 1 and Equation 2 above). For a negative weight w, it follows that at least one of the weights for $P_0$ and $P_1$ is smaller than 0.

By way of example, a set of possible weight values according to one or more examples of step 304C above is determined to be {−2, 3, 4, 5, 10}. For a negative inherited weight (i.e., one of {−2, 10} with respect to Equation 1), template matching costs of {−2, 10} are calculated according to step 304D.

According to further embodiments extending the previous examples, an equal weight with respect to a weighted averaging bi-prediction equation is included in the subset of possible BCW weight values for which template matching cost are calculated, even for a negative inherited weight.

By way of example, a set of possible weight values according to one or more examples of step 304C above is determined to be {−2, 3, 4, 5, 10}. When the inherited weight is negative (i.e., one of {−2, 10} with respect to Equation 1), template matching costs of {−2, 4, 10} are calculated according to step 304D (as 4 is an equal weight with respect to Equation 1, even though 4 is not a negative weight with respect to Equation 1).

According to examples of step 304D, a VVC-standard encoder or a VVC-standard decoder configures one or more processors of a computing system to calculate a template matching cost for each among a subset of possible BCW weight values which is similar to an inherited BCW weight. When absolute difference between a weight w and the inherited weight is smaller than a pre-defined threshold, the weight w is similar to the inherited weight. The pre-defined threshold is a non-zero positive integer.

By way of example, a set of possible weight values according to one or more examples of step 304C above is determined to be {−2, 3, 4, 5, 10} and the pre-defined threshold is set to 2. Consequently, for an inherited weight of 4, the template matching costs of {3, 4, 5} are calculated according to step 304D. For an inherited weight of 3, the template matching costs of {3, 4} are calculated according to step 304D. For an the inherited weight of −2, the template matching cost of {−2} is calculated according to step 304D.

By way of another example, a set of possible weight values is determined to be {−4, −3, −2, −1, 1, 2, 3, 4, 5, 6, 7, 9, 10, 11, 12} and the pre-defined threshold is set to 2. Consequently, for an inherited weight of 4, the template matching costs of {3, 4, 5} are calculated according to step 304D. For an inherited weight of 3, the template matching costs of {2, 3, 4} are calculated according to step 304D. For an inherited weight of −2, the template matching costs of {−3, −2, −1} are calculated according to step 304D.

By way of yet another example, a set of possible weight values according to one or more examples of step 304C above is determined to be {1, 2, 3, 4, 5, 6, 7} and the pre-defined threshold is set to 2.

By way of yet another example, a set of possible weight values according to one or more examples of step 304C above is determined to be {0, 1, 2, 3, 4, 5, 6, 7, 8} and the pre-defined threshold is set to 2.

According to examples of step 304D, a VVC-standard encoder or a VVC-standard decoder configures one or more processors of a computing system to calculate a template matching cost for each among a subset of possible BCW weight values based on an inherited BCW weight, the subset being further based on POC distances between a current picture and reference pictures.

By way of example, when using template matching method to derive BCW index for the bi-predicted merge candidates, a POC distance between a current picture and a reference picture from reference picture list 0 (hereinafter referred to as Poc_diff_L0) and a POC distance between the current picture and a reference picture from reference picture list 1 (hereinafter referred to as Poc_diff_L1) are calculated according to step 304D.

For Poc_diff_L0 equal to Poc_diff_L1, template matching costs of all the weights in the set of possible weight values are calculated as in step 304C. For Poc_diff_L0 smaller than Poc_diff_L1, the template matching costs of the weights that are smaller than or equal to an equal weight with respect to a weighted averaging bi-prediction equation are calculated according to step 304D. That is, the weight applied to $P_1$ (i.e., w) is smaller than or equal to the weight applied to $P_0$ (i.e., 8−w with respect to Equation 1, or 16−w with respect to Equation 2), wherein $P_1$ is the predicted signal using reference picture from reference picture list 1 and $P_0$ is the predicted signal using reference picture from reference picture list 0. On the other hand, for Poc_diff_L0 larger than Poc_diff_L1, the template matching costs of the weights that are equal to or larger than an equal weight with respect to a weighted averaging bi-prediction equation are calculated according to step 304D. That is, the weight applied to $P_1$ is larger than or equal to the weight applied to $P_0$.

By way of example, a set of possible weight values according to one or more examples of step 304C above is determined to be {−2, 3, 4, 5, 10}. For Poc_diff_L0 equal to Poc_diff_L1, the template matching costs of {−2, 3, 4, 5, 10} are calculated as in step 403C. For Poc_diff_L0 smaller than Poc_diff_L1, the template matching costs of {−2, 3, 4} are calculated according to step 304D. For Poc_diff_L0 larger than Poc_diff_L1, the template matching costs of {4, 5, 10} are calculated according to step 304D.

According to examples of step 304D, a VVC-standard encoder or a VVC-standard decoder configures one or more processors of a computing system to calculate a template matching cost for each among a subset of possible BCW weight values which is similar to an inherited BCW weight, the subset being further based on POC distances between a current picture and reference pictures.

When using template matching method to derive BCW index for the bi-predicted merge candidates, in addition to Poc_diff_L0 and Poc_diff_L1, a value diff_w is calculated by subtracting the inherited weight from each among a set of possible BCW weight values. For Poc_diff_L0 equal to Poc_diff_L1, template matching costs of those weights for which absolute value of diff_w is smaller than a first pre-defined threshold are calculated. For Poc_diff_L0 smaller than Poc_diff_L1, template matching costs of those weights for which diff_w is smaller than or equal to 0, and absolute value of diff_w is smaller than a second pre-defined threshold, are calculated. For Poc_diff_L0 larger than Poc_diff_L1, template matching costs of those weights for which diff_w is larger than or equal to 0, and absolute value of diff_w is smaller than a third pre-defined threshold, are calculated. The first, second and third pre-defined threshold may be the same or different from each other.

By way of example, a set of possible weight values according to one or more examples of step 304C above is determined to be {1, 2, 3, 4, 5, 6, 7}. The first, second and third pre-defined threshold are set to 2, 3 and 3, respectively. Suppose an inherited weight is 4.

Consequently, for Poc_diff_L0 equal to Poc_diff_L1, the template matching costs of {3, 4, 5} are calculated according to step 304D. For Poc_diff_L0 smaller than Poc_diff_L1, the template matching costs of {2, 3, 4} are calculated according to step 304D. For Poc_diff_L0 larger than Poc_diff_L1, the template matching costs of {4, 5, 6} are calculated according to step 304D.

According to further embodiments, when using template matching method to derive BCW index for the bi-predicted merge candidates, Poc_diff_L0, Poc_diff_L1, and an absolute difference between each among a set of possible BCW weight values and the inherited weight are calculated. For Poc_diff_L0 equal to Poc_diff_L1, template matching costs of those weights for which absolute difference is smaller than a first pre-defined threshold are calculated. For Poc_diff_L0 not equal to Poc_diff_L1, template matching costs of those weights for which absolute difference is smaller than a second pre-defined threshold are calculated. The first pre-defined threshold is different from the second pre-defined threshold.

By way of example, a set of possible weight values according to one or more examples of step 304C above is determined to be {1, 2, 3, 4, 5, 6, 7}. The first and second pre-defined threshold are set to 3 and 2, respectively. Suppose an inherited weight is 3.

Consequently, for Poc_diff_L0 equal to Poc_diff_L1, the template matching costs of {1, 2, 3, 4, 5} are calculated according to step 304D. For Poc_diff_L0 not equal to Poc_diff_L1, the template matching costs of {2, 3, 4} are calculated according to step 304D.

Furthermore, at a step 304E, a VVC-standard encoder or a VVC-standard decoder configures one or more processors of a computing system to derive a merge candidate BCW index according to template matching costs while adjusting template matching cost of an inherited BCW weight from a value calculated according to the VVC standard and ECM specifications. As described above, a VVC-standard encoder or a VVC-standard decoder configures one or more processors of a computing system to, for each bi-predicted weight (i.e., BCW index), calculate a template matching cost using a SAD between samples of a template of the merge-coded CU and respective corresponding reference samples. However, since an inherited BCW index from a neighboring block is likely to have higher accuracy than another BCW index, a VVC-standard encoder or a VVC-standard decoder further configures one or more processors of a computing system to adjust template matching cost of the inherited BCW index to be preferentially selected over template matching costs of other BCW indices.

By way of example, a VVC-standard encoder or a VVC-standard decoder configures one or more processors of a computing system to multiply a template matching cost (TMcost) of the inherited BCW index by a weight which is smaller than 1. Therefore, the inherited BCW index has higher probability to be selected. To reduce computational complexity, a VVC-standard encoder or a VVC-standard decoder configures one or more processors of a computing system to perform bitwise shift operations and subtraction operations to avoid multiplication. For example, the weight applied to the template matching cost of the inherited BCW index is set to 0.90625, which can be replaced by TMcost−(TMcost>>4)−(TMcost>>5).

By way of another example, a VVC-standard encoder or a VVC-standard decoder configures one or more processors of a computing system to subtract an offset value from a template matching cost of the inherited BCW index. The offset value is a non-zero positive number and is determined according to quantization parameter ("QP"). For example, the offset value can be set equal to the Lagrange multiplier λ.

Considering the inherited weight having higher accuracy, a weight that is not similar to the inherited weight may be less promising. According to a further embodiment, the template matching cost for a weight that is not similar to the inherited weight is multiplied with a value larger than 1. Based on an absolute difference between a weight and the inherited weight being larger than a pre-defined threshold, the weight is determined to be not similar to the inherited weight. As described above, weights not similar to the inherited weight can be excluded from calculating template matching costs.

By way of example, the pre-defined threshold is set to 1 and a set of possible weight values according to one or more examples of step 304C above is determined to be {−2, 3, 4, 5, 10}. Suppose that the inherited weight is 3. The template matching costs TMcost of {−2, 5, 10} are multiplied by 1.09375, which can be replaced by TMcost+(TMcost>>4)+(TMcost>>5).

According to example embodiments of the present disclosure, a VVC-standard encoder or a VVC-standard decoder configures one or more processors of a computing system to apply bi-directional optical flow ("BDOF") to bi-predicted blocks with equal weight. By BDOF techniques, prediction samples of bi-predicted blocks can be refined.

Furthermore, at a step 304F, optionally, a VVC-standard encoder or a VVC-standard decoder configures one or more processors of a computing system to adjust template matching cost of a BCW weight having equal weight from a value calculated according to the VVC standard and ECM specifications. Since application of BDOF is likely to be beneficial for prediction samples, a VVC-standard encoder or a VVC-standard decoder configures one or more processors of a computing system to adjust a template matching cost of the BCW index with equal weight with respect to a weighted averaging bi-prediction equation to be preferentially selected over template matching costs of other BCW indices. By way of example, a VVC-standard encoder or a VVC-standard decoder configures one or more processors of a computing system to multiply a template matching cost of the BCW index with equal weight with respect to a weighted averaging bi-prediction equation by a weight smaller than 1, or to subtract a positive value from the template matching cost of the BCW index with equal weight with respect to a weighted averaging bi-prediction equation.

Alternatively, a VVC-standard encoder or a VVC-standard decoder configures one or more processors of a computing system to apply BDOF to all bi-predicted blocks regardless of their respective merge candidate BCW indices.

Furthermore, according to example embodiments of the present disclosure, step 304, wherein a VVC-standard encoder or a VVC-standard decoder configures one or more processors of a computing system to derive a merge candidate BCW index according to template matching cost, can be performed before applying ARMC-TM to merge candidates, or can be performed after applying ARMC-TM to merge candidates.

According to some example embodiments, a VVC-standard encoder or a VVC-standard decoder configures one or more processors of a computing system to derive a merge candidate BCW index according to template matching cost before applying ARMC-TM to merge candidates. After a merge candidate list is constructed, a VVC-standard encoder or a VVC-standard decoder configures one or more processors of a computing system to first derive a BCW index of each bi-predicted merge candidate in the merge candidate list according to the template matching cost, then apply ARMC-TM to reorder the merge candidates. A VVC-standard encoder or a VVC-standard decoder further configures one or more processors of a computing system to calculate, during ARMC-TM, template matching cost values for bi-predicted merge candidates using the derived BCW indices.

According to some example embodiments, a VVC-standard encoder or a VVC-standard decoder configures one or more processors of a computing system to derive a merge candidate BCW index according to template matching cost after applying ARMC-TM to merge candidates, reducing decoding complexity. A VVC-standard encoder or a VVC-standard decoder configures one or more processors of a computing system to first reorder merge candidates in a merge candidate list by applying ARMC-TM, and then, during ARMC-TM, calculate template matching cost values for bi-predicted merge candidates using BCW indices inherited from neighboring blocks. A VVC-standard encoder or a VVC-standard decoder further configures one or more processors of a computing system to, then, select a merge candidate according to a signaled merge index; for a selected merge candidate which is bi-predicted, a VVC-standard encoder or a VVC-standard decoder configures one or more processors of a computing system to derive its BCW index according to template matching cost. In this fashion, fewer BCW indices can be derived after applying ARMC-TM compared to the derivation of BCW indices before applying ARMC-TM.

Merge candidate BCW index techniques as described herein can be applied to any subset of possible merge modes which a VVC-standard encoder or a VVC-standard decoder configures one or more processors of a computing system, in accordance with the VVC standard and ECM specifications, to apply in coding CUs. By way of example, a subset of possible merge modes includes a standard merge mode, a template matching merge mode, a decoder-side motion vector refinement mode, an MMVD mode, an affine merge mode, an affine plus MMVD merge mode, and a CIIP mode, and excludes other merge modes.

By way of another example, merge candidate BCW index techniques as described herein are applied to a first subset of possible merge modes for non-low-delay pictures, and a second subset of possible merge modes for low-delay pictures. For instance, a first subset of possible merge modes includes a standard merge mode, a template matching merge mode, a decoder-side motion vector refinement mode, and an affine merge mode, and excludes other merge modes; and a second subset of possible merge modes includes a regular merge mode, a template matching merge mode, a decoder-side motion vector refinement mode, an MMVD mode, an affine merge mode, and an affine plus MMVD merge mode, and excludes other merge modes.

By way of another example, merge candidate BCW index techniques as described herein are applied to a subset of possible merge modes for both non-low-delay pictures and low-delay pictures, including a standard merge mode, a template matching merge mode, a decode-side motion vector refinement mode, a CIIP mode, and an affine merge mode, and excluding other merge modes.

According to some example embodiments, a VVC-standard encoder or a VVC-standard decoder configures one or more processors of a computing system to derive a merge candidate BCW index according to template matching cost while inheriting BCW indices from non-adjacent spatial merge candidates. If, for a current CU coded using decode-side motion vector refinement mode, the BCW index for a non-adjacent spatial merge candidate is not inherited for the current CU, then the BCW index is always set to equal weight when the current CU inherits motion information from the non-adjacent spatial merge candidates. However, the BCW index is inherited from spatial neighboring blocks. Therefore, according to example embodiments of the present disclosure, BCW indices from non-adjacent spatial merge candidates are also inherited for the current CU for decode-side motion vector refinement mode, thereby aligning both modes.

When an additional BCW weight is derived based on POC difference (as described above), a BCW index may or may not be derived using template matching cost for merge mode, as described subsequently.

According to an embodiment, when the BCW index derived using template matching cost is enabled for merge mode, the default weight is always assigned to pairwise and zero merge candidates regardless whether the additional BCW weight is enabled or not.

According to another embodiment, when the inherited weight is the additional BCW weight, the method to derive the BCW index using template matching cost for merge mode is not applied.

According to yet another embodiment, when the method to derive the BCW index using template matching cost is enabled for merge mode, the additional BCW weight is only applied to low temporal layer to further reduce bit overhead.

Persons skilled in the art will appreciate that all of the above aspects of the present disclosure may be implemented concurrently in any combination thereof, and all aspects of the present disclosure may be implemented in combination as yet another embodiment of the present disclosure.

Figure 4:
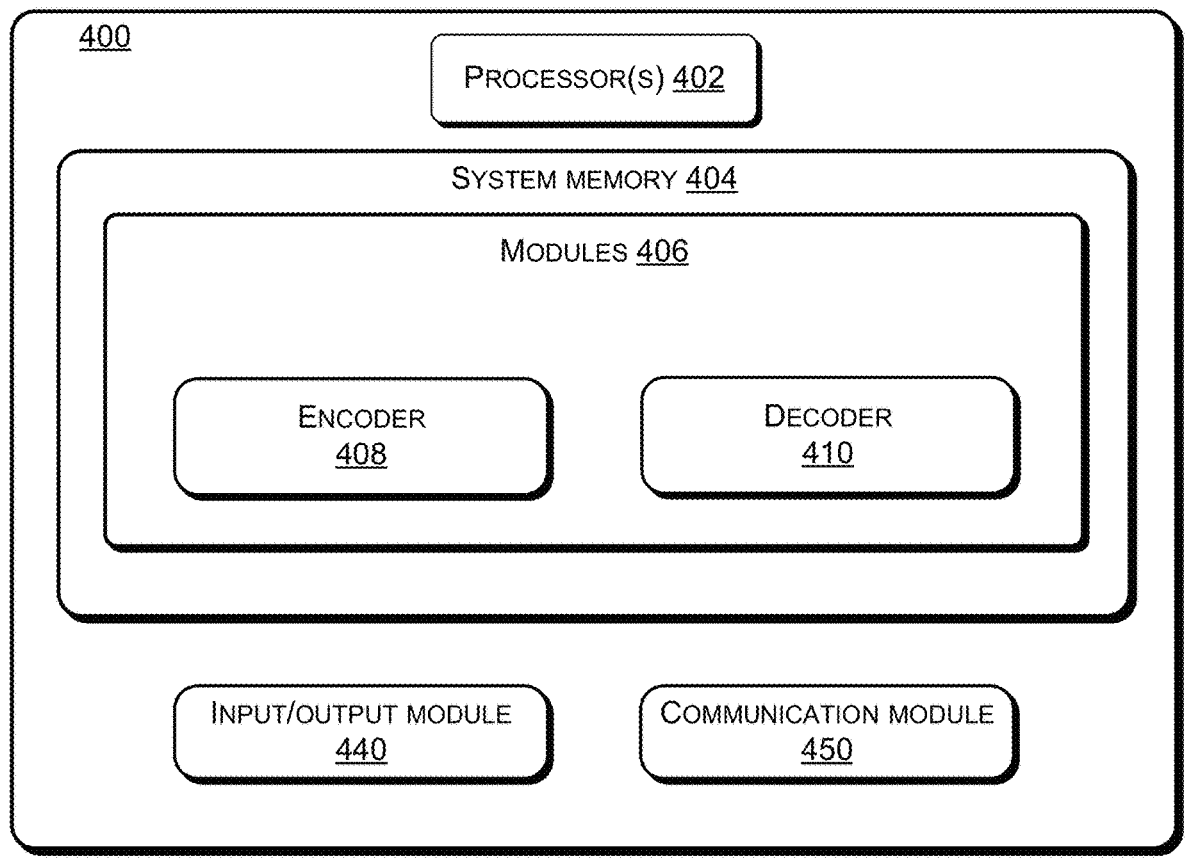
FIG. 4 illustrates an example system for implementing the processes and methods described herein for implementing derivation of a merge candidate BCW index.

FIG. 4 illustrates an example system 400 for implementing the processes and methods described above for implementing derivation of a merge candidate BCW index.

The techniques and mechanisms described herein may be implemented by multiple instances of the system 400 as well as by any other computing device, system, and/or environment. The system 400 shown in FIG. 4 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 400 may include one or more processors 402 and system memory 404 communicatively coupled to the processor(s) 402. The processor(s) 402 may execute one or more modules and/or processes to cause the processor(s) 402 to perform a variety of functions. In some embodiments, the processor(s) 402 may include a central processing unit ("CPU"), a graphics processing unit ("GPU"), both CPU and GPU, or other processing units or components known in the art. Additionally, each of the processor(s) 402 may possess its own local memory, which also may store program modules, program data, and/or one or more operating systems.

Depending on the exact configuration and type of the system 400, the system memory 404 may be volatile, such as RAM, non-volatile, such as ROM, flash memory, miniature hard drive, memory card, and the like, or some combination thereof. The system memory 404 may include one or more computer-executable modules 406 that are executable by the processor(s) 402.

The modules 406 may include, but are not limited to, an encoder 408 and a decoder 410.

The encoder 408 may be a VVC-standard encoder implementing any, some, or all aspects of example embodiments of the present disclosure as described above, and executable by the processor(s) 402 to configure the processor(s) 402 to perform operations as described above.

The decoder 410 may be a VVC-standard encoder implementing any, some, or all aspects of example embodiments of the present disclosure as described above, executable by the processor(s) 402 to configure the processor(s) 402 to perform operations as described above.

The system 400 may additionally include an input/output (I/O) interface 440 for receiving video source data and bitstream data, and for outputting decoded pictures into a reference picture buffer and/or a display buffer. The system 400 may also include a communication module 450 allowing the system 400 to communicate with other devices (not shown) over a network (not shown). The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient or non-transitory computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. A computer-readable storage medium employed herein shall not be interpreted as a transitory signal itself, such as a radio wave or other free-propagating electromagnetic wave, electromagnetic waves propagating through a waveguide or other transmission medium (such as light pulses through a fiber optic cable), or electrical signals propagating through a wire.

The computer-readable instructions stored on one or more non-transient or non-transitory computer-readable storage media that, when executed by one or more processors, may perform operations described above with reference to FIGS. 1A-3. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system, comprising:
one or more processors, and
a computer-readable storage medium communicatively coupled to the one or more processors, the computer-readable storage medium storing computer-readable instructions executable by the one or more processors that, when executed by the one or more processors, perform associated operations comprising:
calculating, for each BCW weight value among a subset of possible BCW weight values which is similar to an inherited BCW weight, a respective absolute difference between the respective BCW weight value and the inherited BCW weight; and
calculating a template matching cost of each BCW weight value for which a respective absolute difference is smaller than a pre-defined threshold; and
deriving, for a bi-predicted merge candidate of a merge candidate list of a merge-coded coding unit (CU), a bi-prediction with CU-level weight (BCW) index of the bi-predicted merge candidate by selecting a BCW weight value yielding a lowest template matching cost among each template matching cost calculated as the BCW index of the bi-predicted merge candidate.

2. The computing system of claim 1, wherein a template matching cost comprises a sum of absolute differences between samples of a template of the merge-coded CU and respective corresponding reference samples.

3. The computing system of claim 1, wherein deriving a BCW index of the bi-predicted merge candidate according to a template matching cost comprises:
  calculating a template matching cost for each BCW weight value among a set of possible BCW weight values, and
  selecting a BCW weight value yielding a lowest template matching cost among each template matching cost calculated as the BCW index of the bi-predicted merge candidate.

4. The computing system of claim 3, wherein the associated operations further comprise:
  calculating a weighted averaging bi-prediction according to an equation comprising $P_{bi-pred}=((16-w)*P_0+w*P_1+8)>>4$.

5. The computing system of claim 4, wherein the set of possible BCW weight values comprises {6, 7, 8, 9, 10}.

6. The computing system of claim 1, wherein deriving a BCW index of the bi-predicted merge candidate according to a template matching cost comprises:
  calculating a template matching cost for each BCW weight value among a subset of possible BCW weight values based on an inherited BCW weight, and;
  selecting a BCW weight value yielding a lowest template matching cost among each template matching cost calculated as the BCW index of the bi-predicted merge candidate.

7. The computing system of claim 6, wherein the template matching cost is calculated for each BCW weight value among a subset of possible BCW weight values based on the inherited BCW weight being a negative weight with respect to a weighted averaging bi-prediction equation.

8. The computing system of claim 7, wherein the weighted averaging bi-prediction equation comprises $P_{bi-pred}=((8-w)*P_0+w*P_1+4)>>3$.

9. The computing system of claim 1, wherein deriving a BCW index of the bi-predicted merge candidate according to a template matching cost comprises:
  calculating a template matching cost for each BCW weight value among a subset of possible BCW weight values based on an inherited BCW weight, the subset being further based on respective picture order count (POC) distances between a current picture and a plurality of reference pictures, and;
  selecting a BCW weight value yielding a lowest template matching cost among each template matching cost calculated as the BCW index of the bi-predicted merge candidate.

10. The computing system of claim 9, wherein the respective POC distances comprise a first POC distance between the current picture and a reference picture of a first reference picture list, and a second POC distance between the current picture and a reference picture of a second reference picture list.

11. The computing system of claim 10, wherein calculating a template matching cost for each BCW weight value among a subset of possible BCW weight values comprises:
  calculating a template matching cost of each BCW weight value smaller than or equal to an equal weight with respect to a weighted averaging bi-prediction equation, in the event that the first POC distance is smaller than the second POC distance; and
  calculating a template matching cost of each BCW weight value equal to or larger than the equal weight, in the event that the first POC distance is larger than the second POC distance.

12. The computing system of claim 11, wherein the weighted averaging bi-prediction equation comprises $P_{bi-pred}=(8-w)*P_0+w*P_1+4)>>3$.

13. The computing system of claim 1, wherein the associated operations further comprise:
  adjusting a template matching cost of an inherited BCW weight to be preferentially selected over template matching costs of other BCW weights.

14. The computing system of claim 13, wherein adjusting the template matching cost of the inherited BCW weight comprises multiplying the template matching cost of the inherited BCW weight by a weight smaller than 1.

15. The computing system of claim 13, wherein adjusting the template matching cost of the inherited BCW weight comprises applying a bitwise shift operation and a subtraction operation to scale the template matching cost of the inherited BCW weight by a factor smaller than 1.

16. The computing system of claim 1, wherein the associated operations further comprise:
  adjusting a template matching cost of a BCW weight comprising an equal weight with respect to a weighted averaging bi-prediction equation to be preferentially selected over template matching costs of other BCW weights.

17. The computing system of claim 16, wherein adjusting the template matching cost of the BCW weight comprising an equal weight comprises multiplying the template matching cost of the BCW weight comprising an equal weight by a weight smaller than 1.

* * * * *